(12) United States Patent
Pollak

(10) Patent No.: US 7,735,890 B2
(45) Date of Patent: Jun. 15, 2010

(54) HATCHBACK ASSEMBLY

(75) Inventor: Martin Pollak, Puchheim (DE)

(73) Assignee: Webasto AG, Stockdorf (DE)

( * ) Notice: Subject to any disclaimer, the term of this patent is extended or adjusted under 35 U.S.C. 154(b) by 81 days.

(21) Appl. No.: 11/814,139

(22) PCT Filed: Jan. 16, 2006

(86) PCT No.: PCT/DE2006/000048

§ 371 (c)(1),
(2), (4) Date: Jan. 31, 2008

(87) PCT Pub. No.: WO2006/076885

PCT Pub. Date: Jul. 27, 2006

(65) Prior Publication Data

US 2009/0140544 A1    Jun. 4, 2009

(30) Foreign Application Priority Data

Jan. 17, 2005   (DE) .................. 10 2005 002 203

(51) Int. Cl.
    *B60R 5/04*    (2006.01)
(52) U.S. Cl. ................ 296/26.08; 296/57.1; 296/106
(58) Field of Classification Search ............. 296/50,
    296/51, 56, 57.1, 61, 26.01, 26.08, 26.1,
    296/37.1, 106; 224/497, 543, 924, 504
    See application file for complete search history.

(56) References Cited

U.S. PATENT DOCUMENTS

| 2,353,820 | A | * | 7/1944 | Eddins | 296/26.11 |
| 2,848,271 | A | * | 8/1958 | Reilly | 296/37.1 |
| 2,889,097 | A | * | 6/1959 | Broehl | 224/542 |
| 3,082,033 | A | | 3/1963 | Bosher | |
| 4,907,728 | A | * | 3/1990 | Giblet | 224/585 |
| 5,806,906 | A | * | 9/1998 | Hammond | 296/26.01 |
| 6,174,012 | B1 | * | 1/2001 | Saffold | 296/37.6 |
| 6,375,055 | B1 | * | 4/2002 | Spykerman et al. | 224/542 |
| 6,783,170 | B1 | * | 8/2004 | Van Den Acker et al. | 296/146.16 |
| 6,908,142 | B2 | * | 6/2005 | Gougeon et al. | 296/146.8 |

FOREIGN PATENT DOCUMENTS

| DE | 196 19 126 A1 | | 11/1997 |
| DE | 19813025 | * | 3/1998 |
| FR | 2 745 772 A1 | | 9/1997 |
| FR | 2 796 033 A1 | | 1/2001 |
| FR | 2 845 053 A1 | | 4/2004 |
| GB | 507 800 | | 6/1936 |
| GB | 1 123 759 | | 8/1968 |

* cited by examiner

*Primary Examiner*—Dennis H Pedder
*Assistant Examiner*—Pinel E Romain
(74) *Attorney, Agent, or Firm*—David S. Safran; Roberts Mlotkowski Safran & Cole, P.C.

(57) ABSTRACT

A tailgate arrangement which is located in the region of the rear opening (12) of a vehicle and in the closed position borders a cargo space (16), has an upper tailgate part (18) which is coupled in the region of the upper edge (20) of the rear opening (12) and a lower tailgate part (22) which is coupled in the region of the lower edge (24) of the rear opening (12) of the vehicle and is aligned essentially horizontally in the open position. An expansion element (28) is detachably fixed on the inside of the lower tailgate part (22) and in the open position of the lower tailgate part (22) expands the cargo space (16) and closes it relative to the exterior of the vehicle.

17 Claims, 5 Drawing Sheets

HATCHBACK ASSEMBLY

BACKGROUND OF THE INVENTION

1. Field of the Invention

The invention relates to a tailgate arrangement which is located in the region of the rear opening of a vehicle and in the closed position borders the rear of a cargo space in which the tailgate has an upper tailgate part and a lower tailgate part which is coupled in the region of the lower edge of the rear opening of the vehicle and is aligned essentially horizontally in the open position

2. Description of Related Art

German Patent Application DE 196 19 126 A1 discloses a tailgate arrangement of a motor vehicle which is located in the region of the rear opening of the vehicle and which in the closed position borders the rear of a cargo space. The tailgate arrangement comprises an upper tailgate part and a lower tailgate part. The upper tailgate part is coupled in the region of the top edge of the rear opening and can be pivoted up for opening. The lower tailgate part is coupled in the region of the bottom edge of the rear opening of the vehicle and is aligned essentially horizontally in the open position.

The lower tailgate part in tailgate arrangements made in this way can generally be opened individually, i.e., independently of the upper tailgate part. Long articles can thus be transported such that they emerge to the rear out of the cargo space through the region of the rear opening of the vehicle which remains due to the opened lower tailgate part. However, there is then the problem that dirt and exhaust gases can penetrate into the interior of the vehicle via this opening region.

SUMMARY OF THE INVENTION

The object of the invention is to provide a tailgate arrangement of the initially described type that affords improved interior protection.

This object is achieved in accordance with the invention by the tailgate arrangement by an expansion element being attached on the inside of the lower tailgate part which expands the cargo space and closes it to the outside in the open position of the lower tailgate part.

Therefore, in accordance with the invention, a cover formed from the expansion element can preferably be detachably fastened to the lower tailgate part of a multipart, horizontally divided tailgate of a vehicle, which part can be folded away to the bottom, and borders a space which adjoins the cargo space of the motor vehicle to the rear. This yields additional cargo space which is closed with respect to the vehicle exterior. The altogether available stowage space is therefore enlarged. Thus, articles with an excess length which corresponds at most to the extension of the expansion element in the lengthwise direction of the vehicle can be transported reliably and without adversely affecting the comfort in the vehicle interior. The expansion element, at the same time, constitutes a safeguard for the articles to be transported, since it can be used as the rear stop for them. Since the expansion element covers the open region which is formed by the opening of the lower tailgate part, the actual cargo space is closed relative to the vehicle exterior in spite of the opened lower tailgate part. Penetration of dirt and exhaust gases into the interior of the vehicle can thus be effectively prevented.

The expansion element, and thus the stowage space formed by the expansion element, can end to the rear with the lower tailgate part or also project beyond it.

To improve the sealing of the vehicle interior, in one preferred embodiment of the tailgate arrangement in accordance with the invention, the expansion element is provided on its edges, at least in regions, with a sealing means which is formed, preferably, as a sealing profile or sealing lip, and which interacts with the lower tailgate part, the upper tailgate part and/or vehicle body regions. The side edges of the expansion element can also interact with a sealing profile which is provided anyway on the corresponding edges of the rear opening and which interacts with it with the lower tailgate part closed.

The expansion element can be attached to the lower tailgate part in diverse ways. For example, the expansion element can be slipped onto the lower tailgate part via guide elements, such as guide rails. In its installed position, the expansion element can then be locked on a catch means of the lower tailgate part.

Alternatively, the expansion element can be clipped onto the lower tailgate part. The expansion element can also be attached to the lower tailgate part by a tension means which is formed, for example, from friction pieces or the like. The expansion element can also be screwed to the tailgate part.

In order to be able to lock the upper tailgate part in the closed position, the expansion element preferably has a locking means for the upper tailgate part in its upper edge region. The locking means is formed, for example, from a lock clip which interacts with a lock mechanism integrated on the upper tailgate part.

In one especially stable embodiment, the expansion element is made essentially rigid. For example, it can be made preferably of glass-fiber reinforced plastic. However, it is also conceivable for the expansion element to be made of metal.

One embodiment which promotes stowage space is an expansion element formed from a film. The expansion element can be folded when not in use and can be accommodated, for example, in a stowage pocket. In this case, it is advantageous if the expansion element can be provided with rods for stabilization which dictate the shape of the additional stowage space enclosed by the expansion element.

The expansion element can also be made such that, when not in use, it is folded together on the inside of the lower tailgate part, and can be folded out when needed.

In particular, a rigid embodiment of the expansion element can be designed such that it can be fixed as a stowage trough in the cargo space which then has not been expanded to the rear. Therefore, in this case, the expansion element can assume the function of a dirt trough or the like which can be used especially for safeguarded transport of dirty articles in the cargo space. In the cargo space, then, there are preferably attachment means by which the expansion element can be fastened.

One special embodiment of the expansion element comprises a load carrier means. It is preferably made on the top of the expansion element and is used preferably for transport of bulky articles. For example, the load carrier means can comprise a bicycle carrier which is made in the manner of conventional rear bicycle carriers with rails for holding the wheels of the bicycle being transported. The rails for holding the wheels can be detachably fastened to the expansion element, but can also be foldable or able to telescope in order to be available only if necessary.

The load carrier means can also comprise a storage surface which is made on the top of the expansion element for bulky articles or the like. The storage surface can be provided with anti-slip means.

To increase safety, the expansion element can also comprise lighting means for the pertinent vehicle, distance sensors and/or also a license plate holder.

There can also be a circuit which controls distance sensors which are used for a parking assistant or the like and which are integrated into the bumper such that the vehicle rear which has been lengthened by the folded-down lower tailgate part is taken into account.

If the expansion element comprises electrical means, it is advantageous if it is provided with electrical contact elements which interact with the corresponding electrical contact elements which are made preferably on the lower tailgate part. The contact elements are preferably formed from plug connectors. In particular, there can be plate contacts which contact pins or the like engage.

The subject matter of the invention is furthermore an expansion element for a cargo space of a motor vehicle for fixing on the inside of the lower tailgate part of a tailgate arrangement which has at least one upper tailgate part and one lower tailgate part so that the cargo space in the open position of the lower tailgate part is expanded to the rear. This expansion element can, if needed, be easily attached to the lower tailgate element of a multi-part vehicle tailgate so that the cargo space of the vehicle is enlarged to the rear.

Other advantages and advantageous configurations of the subject matter in accordance with the invention can be taken from the following detailed description together with the accompanying drawings which show two embodiments of an expansion element made in accordance with the invention.

DETAILED DESCRIPTION OF THE INVENTION

Figure 1:
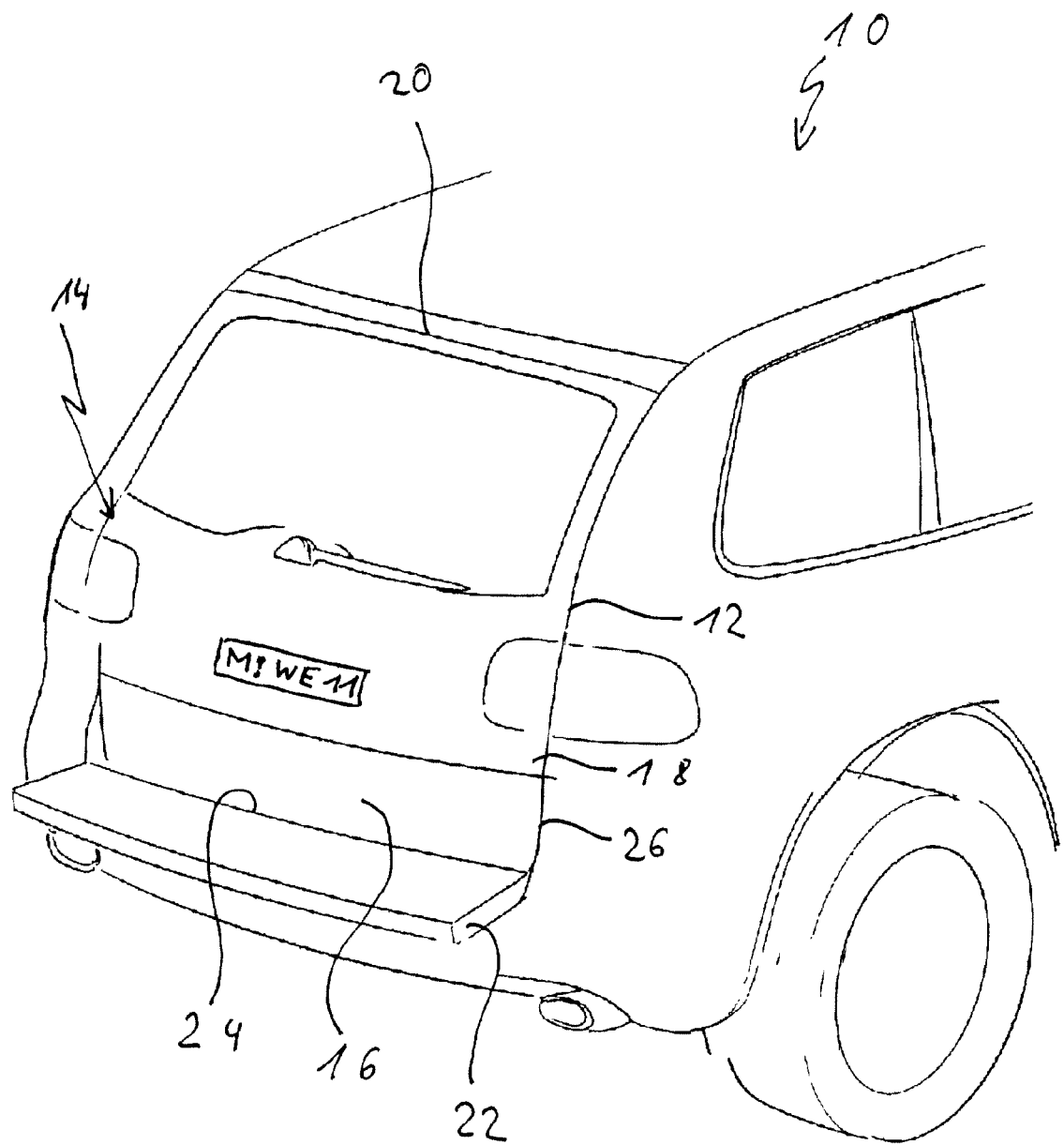
FIG. 1 is a perspective view of the rear portion of a motor vehicle that has a cargo space closed to the rear by a two-part tailgate, the lower tailgate part being open/lowered.

FIG. 1 shows a motor vehicle 10, made as a so-called SUV (sports utility vehicle), which has a rear opening 12 which can be closed by means of a tailgate arrangement 14. The tailgate arrangement 14 borders the rear of the cargo space 16 of the motor vehicle.

The tailgate arrangement 14 is horizontally divided in the lower region and into an upper tailgate part 18 which is supported in the region of the upper edge 20 to be able to pivot on the vehicle superstructure, and therefore, can be swung up for opening, and a lower tailgate part 22, which is supported in the region of the lower edge 24 of the rear opening 12 to be able to pivot on the vehicle superstructure and which can be folded down independently of the upper tailgate part 18. In the closed position, the inner side of the lower tailgate part 18 borders the rear of the cargo space 16. When only the lower tailgate part 22 is opened, an opening region 26 is provided between the upper tailgate part 18 and the lower edge 24 of the rear opening 12 via which the cargo space 16 is accessible. The lower tailgate part 22 can be locked in its open position (shown in FIG. 1) so that lengthening of the cargo surface of the cargo space 16 arises by the inside of the lower tailgate part.

The tailgate arrangement 14, especially the upper tailgate part 18, can be made of polycarbonate, and license plate lighting, back lights and the like can be integrated into the upper tailgate part 18.

Figure 2:
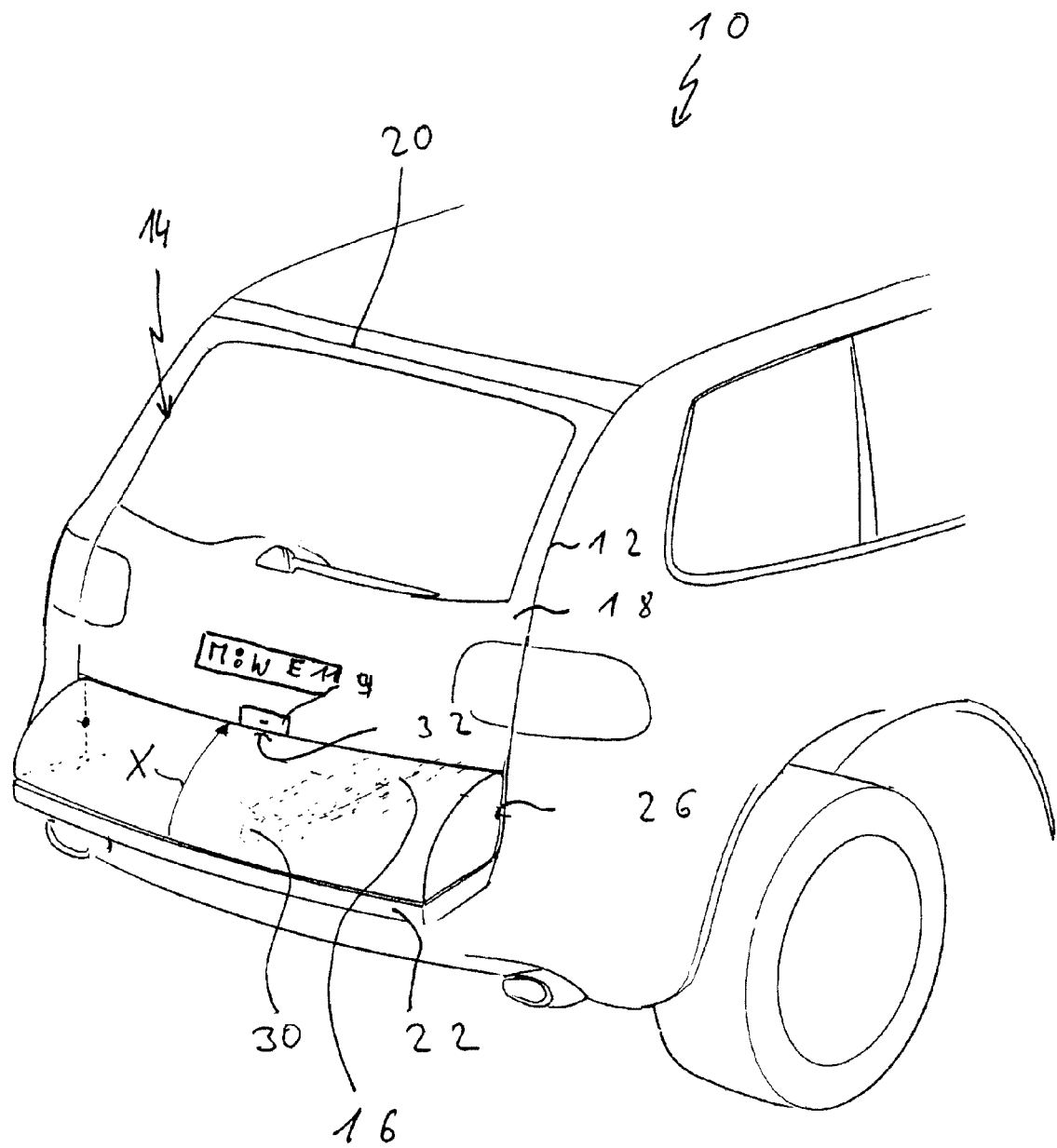
FIG. 2 is a view corresponding to FIG. 1, but showing the cargo space expanded using an expansion element on the lower tailgate part.

As is shown in FIG. 2, to expand the cargo space 16, a cargo space expansion element 28 can be placed on the inside of the lower tailgate part 22. The of edges of the cargo space expansion element 28, on the one hand, run along the edges of the lower tailgate part 22, and on the other hand, along the edges of the open region which is located between the upper tailgate part 18 and the lower edge of the rear opening 12. Thus, the cargo space 16 is enlarged to the rear by the expansion element 28 and closed in spite of the opened lower tailgate part 22. By enlarging the cargo space 16, long articles such as, for example, skis 30 can be transported in the vehicle interior.

For attachment, the expansion element 28 can be slipped from the rear onto the lower tailgate part 22 via a rail system (not shown in detail), and in its operating position locks on a catch means of the lower tailgate part 22.

If expansion of the cargo space 16 is no longer necessary, the expansion element 29 can be removed again and the lower tailgate part 22 folded up for closing the opening region 26. However, the lower tailgate part 22, as is represented in FIG. 2 using the arrow X, can also be closed with the expansion element 28 in place.

In order to ensure good sealing of the opening region 26, sealing lips or sealing profiles are provided on the edges of the expansion element. These sealing lips or sealing profiles interact with the lower tailgate part 22, the upper tailgate part 18 and the side edges of the rear opening 16.

On its upper edge, the expansion element 28 has a lock clip 32 which interacts with a lock 34 on the lower edge of the upper tailgate part 18.

In this case, the expansion element 28 is produced from glass fiber-reinforced polyurethane according to the so-called LFI (long fiber injection) process. Alternatively, the expansion element 28 can also be made of a film clamped with a wire frame or the like.

Figure 3:
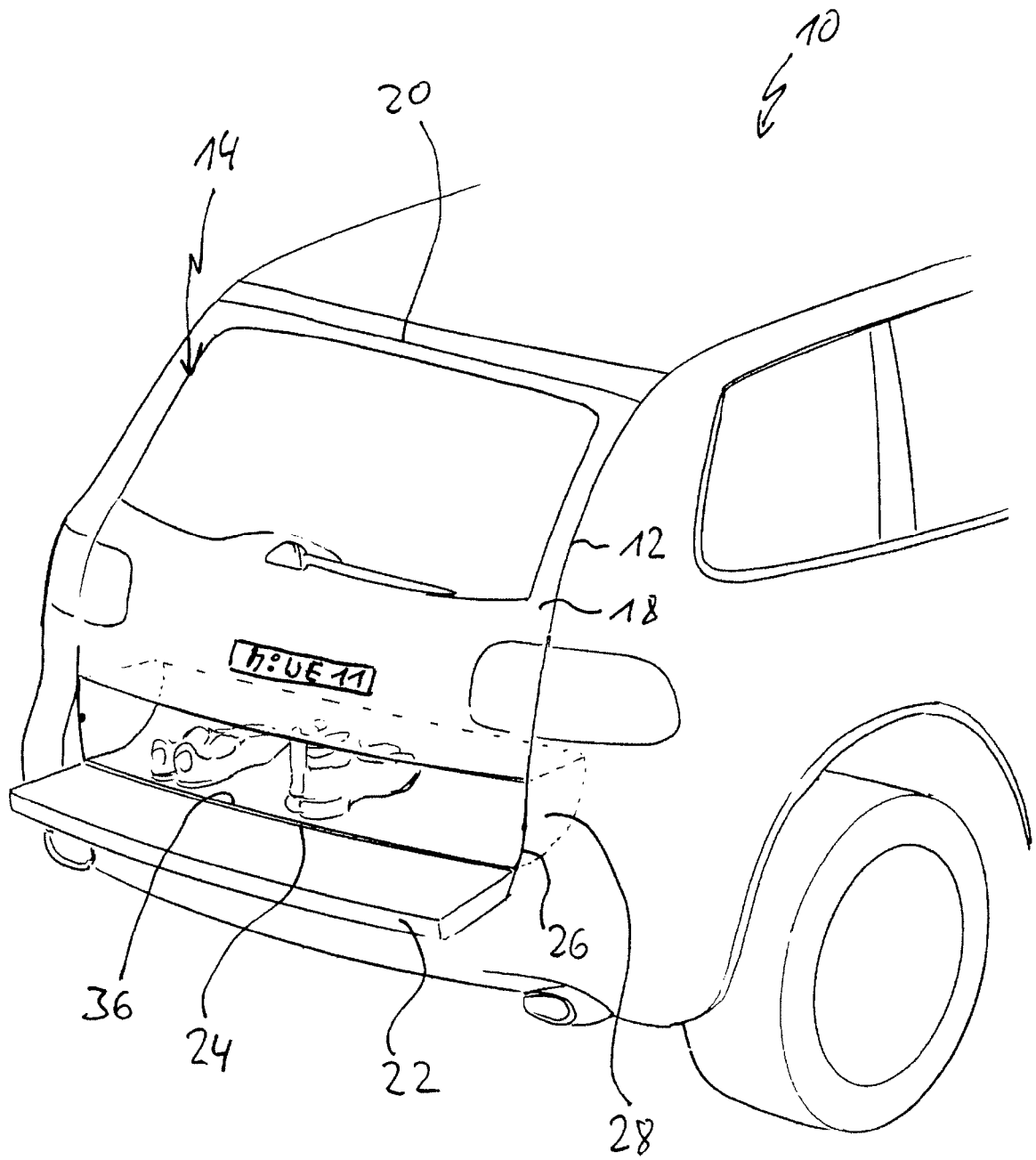
FIG. 3 is a view corresponding to FIG. 2, but showing the use of the cargo space expansion element as a load trough.
Figure 4:
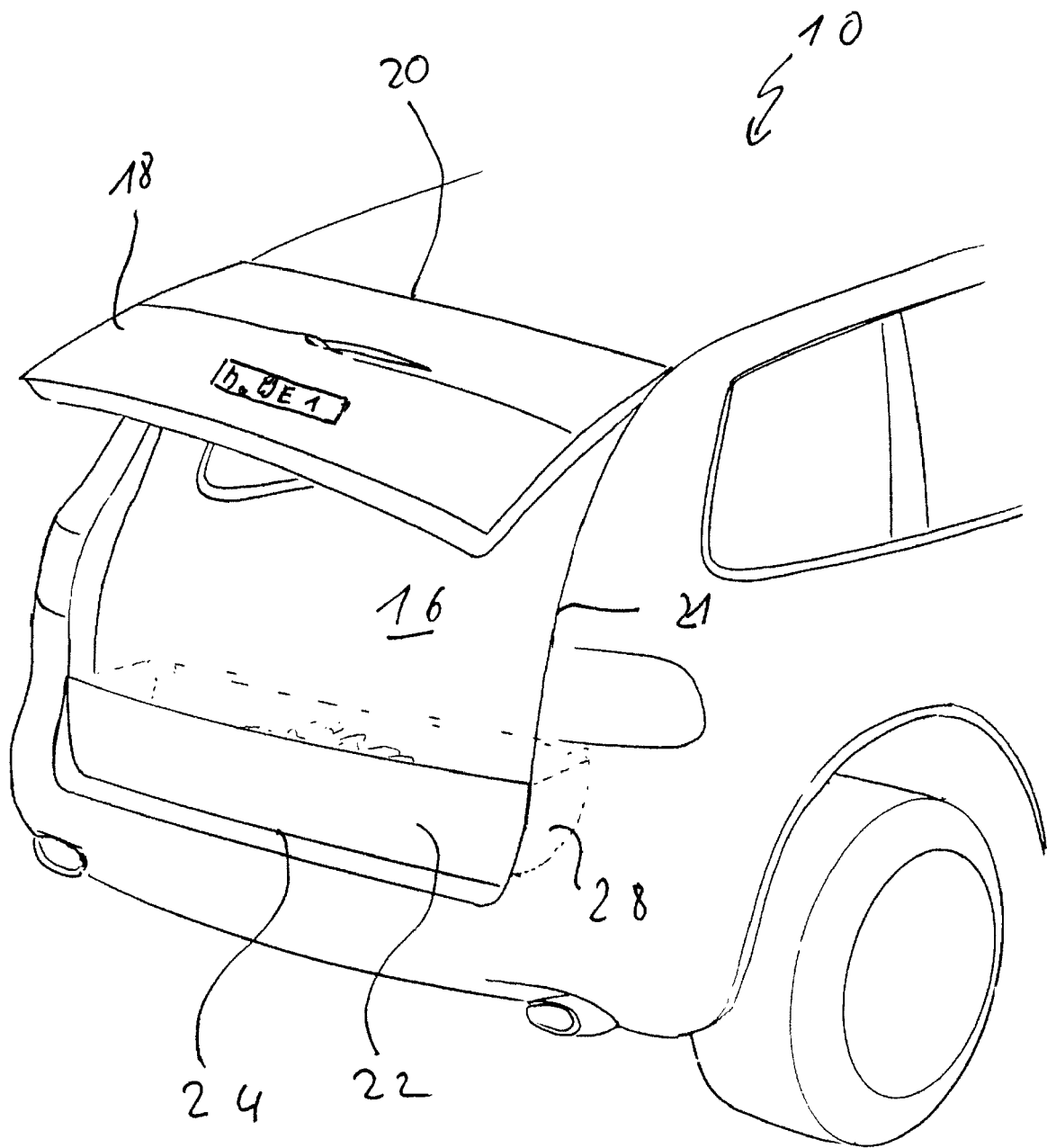
FIG. 4 is a view corresponding to FIG. 3, but with the lower tailgate part closed and the upper tailgate part opened/raised.

The expansion element 28 is made such that, as shown in FIGS. 3 & 4, it can be used in the reverse arrangement as a stowage trough in the rear area of the cargo space 16. As a stowage trough, the expansion element 28 can be used, for example, for stowage of dirty articles, such as shoes. For attachment in this position, the expansion element 28 can be either clamped between the side walls of the cargo space 16 or can be connected to a fastening means intended specifically for this purpose.

On its lower back edge, which lies forward at the top in use of element 28 as an expansion for the cargo space, the expansion element 28 has a projection 36 which is directed upward in the manner of a loading edge which ensures that dirt is held in the stowage trough.

The expansion element 28 used as a stowage trough can be loaded and unloaded either as shown in FIG. 4 with the upper tailgate part 18 opened, or as shown in FIG. 3, with the lower tailgate part 22 opened.

Figure 5:
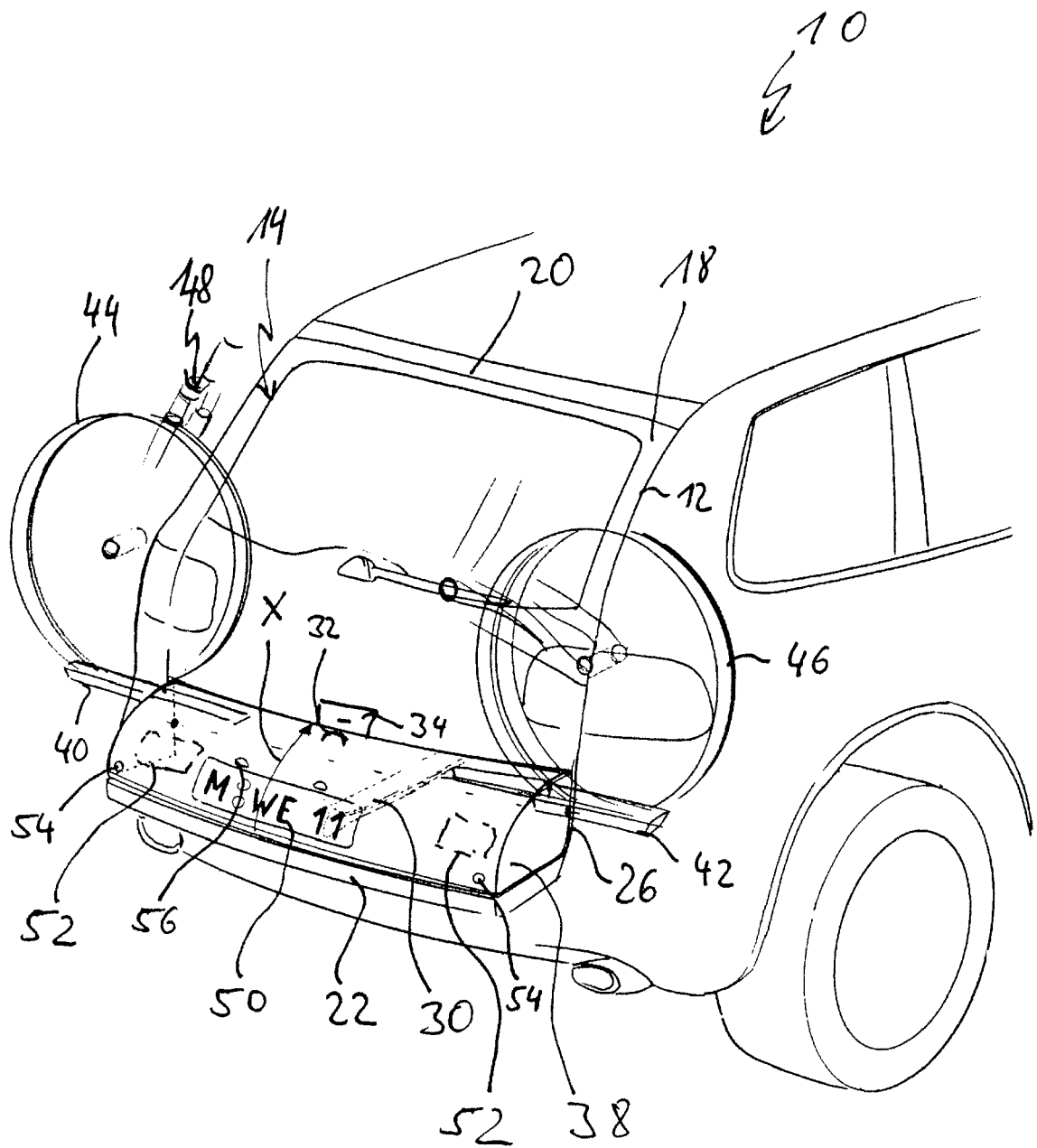
FIG. 5 is a view corresponding to FIG. 2, but showing a second embodiment of the cargo space expansion element.

FIG. 5 shows a vehicle 10 which corresponds to the vehicle as shown in FIG. 1 and which is provided with an expansion element 38 which constitutes a second embodiment for a cargo space.

The expansion element 38 corresponds in its basic shape to the expansion element shown in FIGS. 2 to 4, but differs from it in that it can also be used as a load carrier. In particular, the expansion element 38 comprises rail-like receivers 40, 42 for the wheels 44, 46 of a bicycle 48. The receivers 40, 42 are each made to be able to telescope so that, when not in use, they are held completely within the body of the expansion element 38 which forms an additional stowage space.

Furthermore, there is a license plate holder 50 provided with lights 56, rear vehicle lighting means 52 and distance sensors 54 on the expansion element 38. The electrical components which comprise the lighting means 52, the distance sensors 54 and the license plate holder lights 56 are connected via plug connectors to corresponding plug connectors which are made on the lower tailgate part 22. The plug connectors can each be made as plate contacts and/or as pin contacts and thus enable simple installation of the expansion element 38.

When the receivers 40, 42 for the bicycle wheels 44, 46 are retracted, the expansion element 38, as is shown in FIG. 5 by the arrow X, can be swung up together with the tailgate part 22 so that the lower tailgate part 22 can be closed even with the expansion element 38 mounted.

The expansion element 38 constitutes a cargo space enlargement which can be used even when driving fast and which enables baggage to be securely held. Moreover, the cargo space expansion 38 ensures that, with the lower tailgate part 22 open, dirt and exhaust gases cannot penetrate into the vehicle interior.

What is claimed is:

1. Tailgate arrangement of a motor vehicle which is located in a region of a rear opening of the vehicle and in the closed position borders the rear of a cargo space, comprising:
    an upper tailgate part which is coupled in a region of an upper edge of the rear opening of the vehicle,
    a lower tailgate part which is coupled in a region of a lower edge of the rear opening of the vehicle and is aligned essentially horizontally in an open position, and
    a rigid expansion element which is attachable on an inner side of the lower tailgate part, and which expands the cargo space and closes it relative to the exterior of the vehicle when the lower tailgate part is in the open position and the upper tailgate part is closed, the rigid expansion element being positionable so as to be open toward the interior of the vehicle and closed relative to the upper and lower tailgate parts and relative to adjoining portions of side walls of the vehicle in a region extending between the closed upper tailgate part and a lower edge of the rear opening.

2. Tailgate arrangement as claimed in claim 1, wherein the rigid expansion element is provided with a sealing means on edges thereof at least in regions which interact with at least one of the lower tailgate part, the upper tailgate part and the vehicle body.

3. Tailgate arrangement as claimed in claim 2, wherein the rigid expansion element is mountable as a stowage trough in the cargo space.

4. Tailgate arrangement as claimed in claim 3, wherein the rigid expansion element comprises a load carrier means.

5. Tailgate arrangement as claimed in claim 1, further comprising guide means for enabling the expansion element to be slipped onto the lower tailgate.

6. Tailgate arrangement as claimed in claim 1, wherein the rigid expansion element is clipped onto the lower tailgate part.

7. Tailgate arrangement as claimed in claim 1, wherein the expansion element is fixed on the lower tailgate part by at least one of a tension and a screw means.

8. Tailgate arrangement as claimed in claim 1, wherein the rigid expansion element has a locking means for engagement with the upper tailgate part.

9. Tailgate arrangement as claimed in claim 1, wherein the rigid expansion element is formed essentially of a film material.

10. Tailgate arrangement as claimed in claim 1, wherein a rigid expansion element is mountable as a stowage trough in the cargo space.

11. Tailgate arrangement as claimed in claim 1, wherein the rigid expansion element comprises a load carrier means.

12. Tailgate arrangement as claimed in claim 11, wherein the load carrier means comprises a bicycle carrier.

13. Tailgate arrangement as claimed in claim 1, wherein the rigid expansion element comprises a license plate holder.

14. Tailgate arrangement as claimed in claim 1, wherein the rigid expansion element comprises lighting means.

15. Tailgate arrangement as claimed in claim 1, wherein the rigid expansion element comprises distance sensors.

16. Tailgate arrangement as claimed in claim 1, wherein the rigid expansion element comprises electrical contact elements which interact with the corresponding electrical contact elements on the lower tailgate part.

17. Tailgate arrangement as claimed in claim 1, wherein the load carrier means comprises a bicycle carrier.

* * * * *